US012689828B2

(12) United States Patent
Saito

(10) Patent No.: US 12,689,828 B2

(45) Date of Patent: Jul. 21, 2026

(54) IMAGE PICKUP APPARATUS WITH IMAGE STABILIZATION THAT REDUCES POSITIONAL SHIFT IN THE IMAGE SIGNAL, CONTROL METHOD OF THE SAME, AND STORAGE MEDIUM

(71) Applicant: CANON KABUSHIKI KAISHA, Tokyo (JP)

(72) Inventor: Junichi Saito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 236 days.

(21) Appl. No.: 18/585,432

(22) Filed: Feb. 23, 2024

(65) Prior Publication Data

US 2024/0323529 A1 Sep. 26, 2024

(30) Foreign Application Priority Data

Mar. 24, 2023 (JP) ................................ 2023-047635

(51) Int. Cl.
*H04N 23/68* (2023.01)
*H04N 23/63* (2023.01)

(52) U.S. Cl.
CPC ......... *H04N 23/687* (2023.01); *H04N 23/683* (2023.01); *H04N 23/63* (2023.01)

(58) Field of Classification Search
None
See application file for complete search history.

(56) References Cited

U.S. PATENT DOCUMENTS

| | | | | |
|---|---|---|---|---|
| 2016/0018666 A1* | 1/2016 | Takeuchi | H04N 23/6812 348/208.11 |
| 2016/0054642 A1* | 2/2016 | Takeuchi | G03B 5/02 396/55 |
| 2020/0137309 A1* | 4/2020 | Kulik | H04N 23/6812 |
| 2025/0159348 A1* | 5/2025 | Jeong | H04N 23/55 |

FOREIGN PATENT DOCUMENTS

JP H07270846 A 10/1995

* cited by examiner

*Primary Examiner* — Cynthia Calderon

(74) *Attorney, Agent, or Firm* — Cowan, Liebowitz & Latman, P.C.

(57) ABSTRACT

An image pickup apparatus includes an image sensor configured to photoelectrically convert an optical image formed by an imaging optical system and to output an image signal, and a processor configured to control a first correction unit and a second correction unit for image stabilization. The first correction unit includes a first movable part, and a first rolling member, via which the first movable part is movable in a plane orthogonal to an optical axis of the imaging optical system. The processor is configured to control the first correction unit to perform a first operation of the first movable part that moves the first rolling member to a first position apart from an end of a movable range of the first rolling member, and to control the second correction unit to perform a second operation that reduces a positional shift in the image signal caused by the first operation.

13 Claims, 10 Drawing Sheets

IMAGE PICKUP APPARATUS WITH IMAGE STABILIZATION THAT REDUCES POSITIONAL SHIFT IN THE IMAGE SIGNAL, CONTROL METHOD OF THE SAME, AND STORAGE MEDIUM

BACKGROUND

Technical Field

One of the aspects of the embodiments relates to an image pickup apparatus, a control method of the same, and a storage medium.

Description of Related Art

In order to suppress or eliminate the influence of vibrations, that is, so-called camera shake applied to an image pickup apparatus such as a digital camera, a technology relating to an image stabilizer is widely used that drives a correction lens (image stabilizing lens) in an imaging optical system or an image sensor in a plane orthogonal to the optical axis. Japanese Patent Laid-Open No. 7-270846 discloses a technology for initializing a shake corrector corresponding to an image stabilizer such as a correction lens and an image sensor when a power source (battery) is attached to an image pickup apparatus. Most image stabilizers are configured to be guided in a plane orthogonal to the optical axis via a rolling ball. The initialization operation as disclosed in Japanese Patent Laid-Open No. 7-270846 can place the rolling ball near the center of the movable range, and provide proper image stabilization from the first imaging. Therefore, the initialization operation executed when the power is turned on is important for the image stabilizer.

As disclosed in Japanese Patent Laid-Open No. 7-270846, in a case where the image stabilizer is initialized, the startup time of the image pickup apparatus cannot be shortened.

SUMMARY

An image pickup apparatus according to one aspect of the disclosure includes an image sensor configured to photoelectrically convert an optical image formed by an imaging optical system and to output an image signal, and a processor configured to control a first correction unit and a second correction unit for image stabilization. The first correction unit includes a first movable part, and a first rolling member, via which the first movable part is movable in a plane orthogonal to an optical axis of the imaging optical system. The processor is configured to control the first correction unit to perform a first operation of the first movable part that moves the first rolling member to a first position apart from an end of a movable range of the first rolling member, and to control the second correction unit to perform a second operation that reduces a positional shift in the image signal caused by the first operation. A control method corresponding to the above image pickup apparatus also constitutes another aspect of the disclosure.

Further features of various embodiments of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

First Embodiment

Figure 1A:
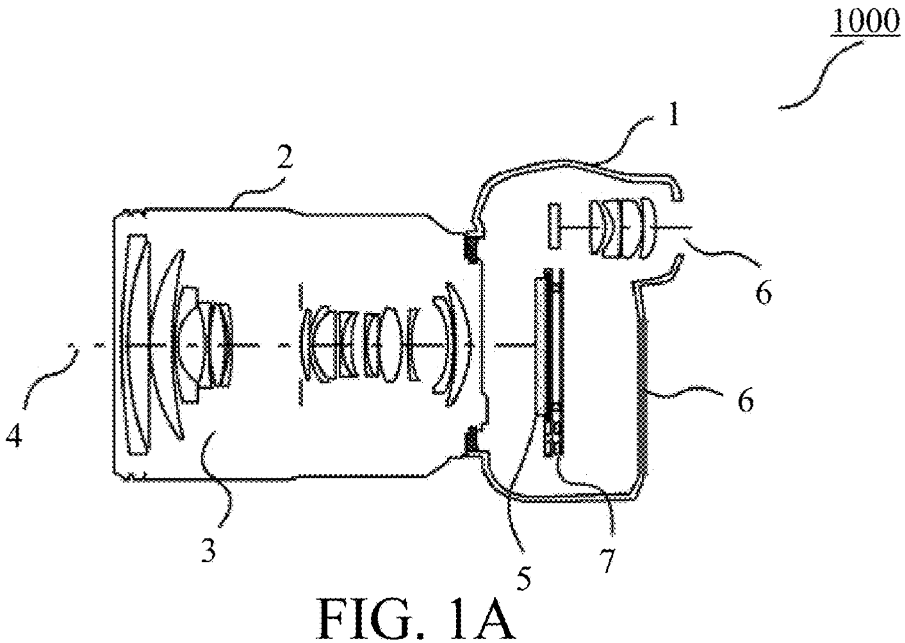
FIGS. 1A and 1B are configuration diagrams of an image pickup apparatus according to a first embodiment.
Figure 1B:
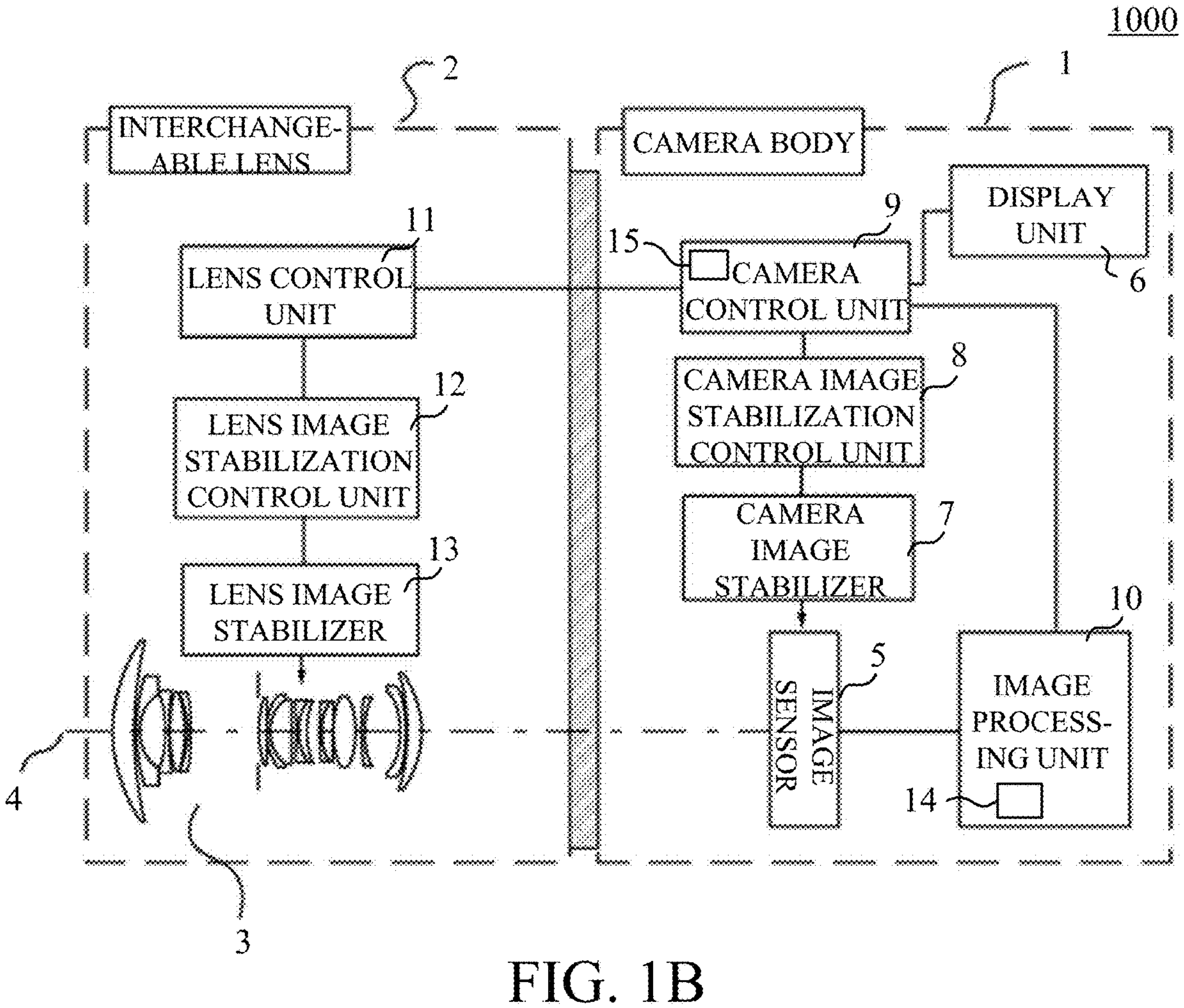

Referring now to FIGS. 1A and 1B, a description will be given of an image pickup apparatus 1000 according to a first embodiment. FIG. 1A is a schematic sectional view of the image pickup apparatus 1000. FIG. 1B is a block diagram of the image pickup apparatus 1000. The image pickup apparatus 1000 is a so-called lens interchangeable type single-lens reflex camera, and includes a camera body (image pickup apparatus body) 1 and an exchangeable lens (lens apparatus) 2 that are attachable to and detachable from each other via a camera mount. This embodiment is not limited to this example, and is also applicable to an image pickup apparatus in which the image pickup apparatus body and the lens apparatus are integrated.

An imaging optical system 3 in an interchangeable lens 2 forms an object image (optical image). An image sensor 5 in the camera body 1 photoelectrically converts (captures) the optical image formed by the imaging optical system 3 and outputs an image signal to an image processing unit 10. The image processing unit 10 performs various development processing for the image signal. The image signal after the development processing is stored as an image file in an unillustrated memory.

The image pickup apparatus 1000 includes a camera image stabilizer (first correction unit) 7 and a lens image stabilizer (second correction unit) 13 in the camera body 1 and the interchangeable lens 2, respectively, in order to suppress deterioration of the captured image due to vibrations such as camera shake applied to the image pickup apparatus 1000. The image pickup apparatus 1000 further includes a camera image stabilization control unit (first control unit) 8 that controls the camera image stabilizer 7, and a lens image stabilization control unit (second control unit) 12 that controls the lens image stabilizer 13. The camera image stabilization control unit 8 and the lens image stabilization control unit 12 cooperatively operate two image stabilizers (camera image stabilizer 7 and lens image stabilizer 13) so as to share a correction amount by a camera control unit 9 and a lens control unit 11, respectively.

In this embodiment, the lens control unit 11 can communicate with the camera control unit 9 and control the lens image stabilizer 13 based on instructions from the camera control unit 9. Therefore, the camera control unit 9 functions as a control unit configured to control the camera image stabilizer 7 and the lens image stabilizer 13.

The camera image stabilizer 7 can move the image sensor 5 in a plane orthogonal to an optical axis 4 (in a direction including a component orthogonal to the optical axis 4). The lens image stabilizer 13 can move a correction lens (image stabilizing lens) included in the imaging optical system 3 in a plane orthogonal to the optical axis 4 (in a direction including a component orthogonal to the optical axis 4). The image pickup apparatus 1000 has a display unit 6 such as a rear liquid crystal panel and an electronic viewfinder. The display unit 6 displays an image signal that has been photoelectrically converted by the image sensor 5 and developed by the image processing unit 10 based on instructions from the camera control unit (control unit) 9.

The image pickup apparatus 1000 includes an electronic image stabilizer (third correction unit) 14 configured to clip (or cut out) a partial region in the image signal acquired by the image sensor 5, and an electronic image stabilization control unit (third control unit) 15 configured to control the electronic image stabilizer 14. The electronic image stabilizer 14 is provided to the image processing unit 10, for example, and clips out a partial region in the image signal acquired by the image sensor 5 based on blur information from an unillustrated blur detector. The electronic image stabilization control unit 15 is provided in the camera control unit 9, for example.

Figure 2A:
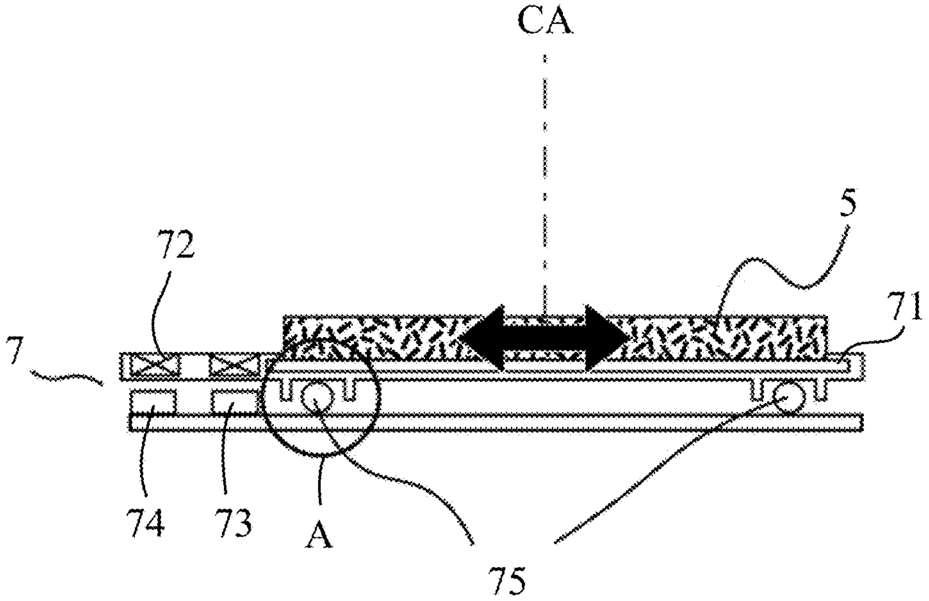
FIGS. 2A, 2B, and 2C explain a camera image stabilizer according to the first embodiment.
Figure 2B:
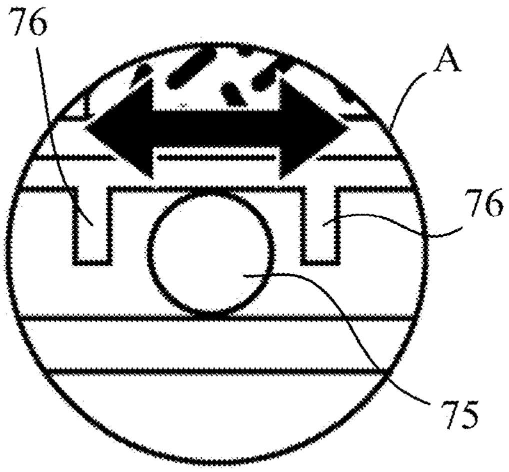
Figure 2C:
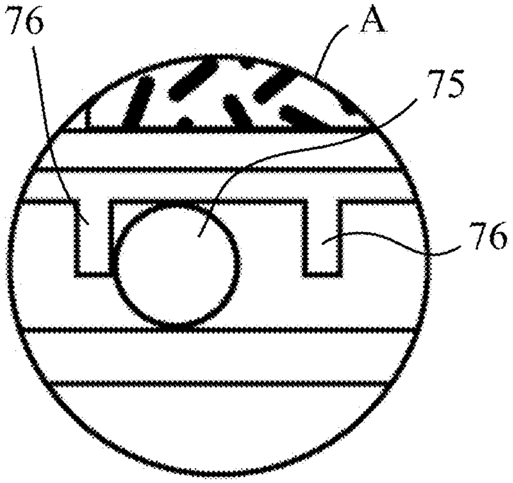

Referring now to FIGS. 2A, 2B, and 2C, a description will be given of driving guidance for the camera image stabilizer 7. FIG. 2A explains the camera image stabilizer 7. The image sensor 5 is provided in a movable part (first movable part) 71 of the camera image stabilizer 7. A driving coil 72 is provided in the movable part 71, and a driving magnet 74 is disposed on an opposite fixed part 73. The movable part 71 is rollably supported relative to the fixed part 73 via three rolling balls (first rolling members) 75 (only two of them are illustrated in FIG. 2A). Due to this configuration, the movable part 71 is movable in a plane (for example, in a black arrow direction illustrated in FIG. 2A) that is orthogonal to an axis parallel to the optical axis 4 (central axis CA of the image sensor 5).

FIG. 2B is an enlarged view of a circled area A near the rolling ball 75 in FIG. 2A. The rolling ball 75 is enclosed by walls (ends of the movable range) 76 provided to the movable part 71 outside the range necessary for image stabilization driving. The wall 76 can prevent the rolling ball 75 from falling off due to impact or the like. FIG. 2C illustrates a state in which the camera body 1 receives a strong impact while the power is turned off, and then the power is turned on and the rolling ball 75 contacts the wall 76 of the movable part 71. The above initialization operation of the rolling ball 75 is an operation necessary for the existence of the state illustrated in FIG. 2C, and a specific method thereof will be described below. In this embodiment, the movable part 71 of the camera image stabilizer 7 is supported by the rolling balls 75, but the movable part of the lens image stabilizer 13 may be similarly supported by rolling balls and configured to contact the walls of the movable part.

Figure 3A:
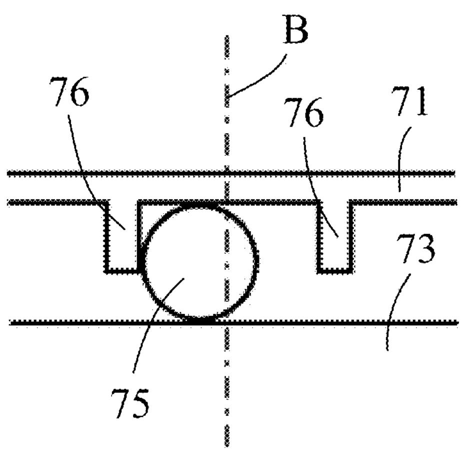
FIGS. 3A, 3B, and 3C explain an equalizing operation of the camera image stabilizer according to the first embodiment.
Figure 3B:
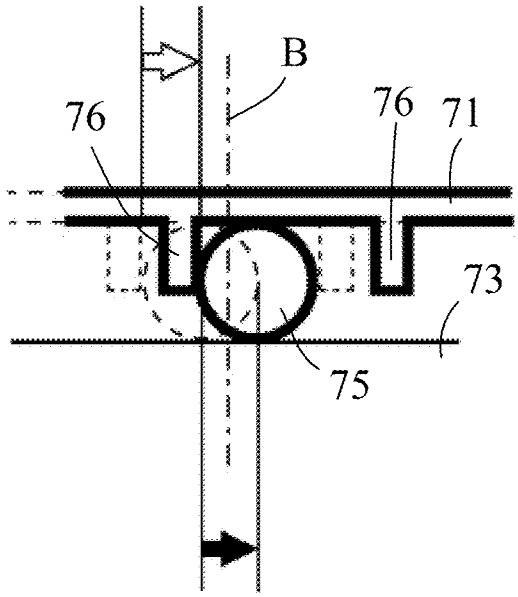
Figure 3C:
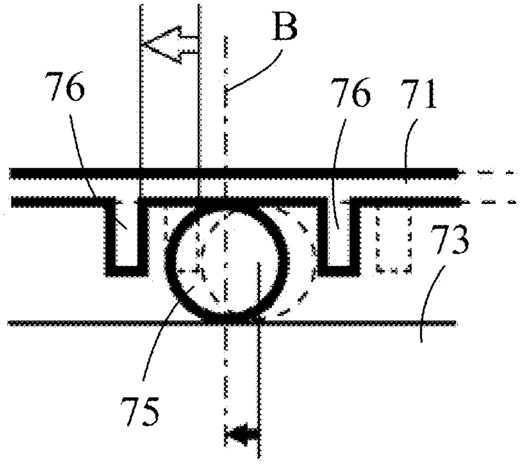

Referring now to FIGS. 3A, 3B, and 3C, a description will be given of an equalizing operation (initialization operation, first operation) of the camera image stabilizer 7. FIGS. 3A, 3B, and 3C explain the equalizing operation of the camera image stabilizer 7, and illustrate how the equalizing operation progresses sequentially from the state of FIG. 2C. In FIGS. 3A, 3B, and 3C, an alternate long and short dash line indicates position B (a reference position, a first position apart from the wall 76 in the movable range) where the rolling ball 75 is to exist as an initial position. In this embodiment, the position B is the center of the movable range, but is not limited to this example, and may be an arbitrary position apart from the wall 76. The equalizing operation is made to place the rolling ball 75 at the position B when the equalizing operation is completed. In other words, the camera image stabilizer 7 performs the equalizing operation (first operation) to move the rolling ball 75 to the first position (reference position) apart from (different from) the wall 76 which is the end of the movable range of the movable part 71.

FIG. 3A corresponds to the state illustrated in FIG. 2C, and illustrates a state in which the rolling ball 75 contacts the wall 76 of the movable part 71 due to an impact received while the camera body 1 is powered off. FIG. 3B illustrates a state in which the equalizing operation has been started and the rolling ball 75 has been pushed farthest to the right. Since the left side of the rolling ball 75 already contacts the wall 76 of the movable part 71 in the state illustrated in FIG. 3A, the rolling ball 75 is dragged and reaches the state illustrated in FIG. 3B without rolling. Therefore, a white arrow length indicating a moving amount of the movable part 71 and a black arrow length indicating a moving amount of the rolling ball 75 are the same. The movable part 71 is moved so that the rolling ball 75 exceeds the position B indicated by an alternate long and short dash line, and the moving amount of the rolling ball 75 (a moving distance corresponding to the black arrow length) and a distance from the position B to the tip of the black arrow are approximately 2:1. In this embodiment, the position that the movable part 71 reaches in FIG. 3B is a position that the movable part 71 does not reach during normal imaging, and is a position that the movable part 71 reaches only during the equalizing operation.

FIG. 3C illustrates a state in which the equalizing operation is completed, and the movable part 71 moves to the left from the state in FIG. 3B. The center of the rolling ball 75, and the center of both the walls 76 in the movable part 71 have completely moved to the position B. During the movement from FIG. 3B to FIG. 3C, the moving amount of the rolling ball 75 (black arrow) becomes half of the relative moving amount (white arrow) between the movable part 71 and the fixed part 73. Therefore, as illustrated in FIG. 3B, the movable part 71 is operated so that the black arrow indicating the moving amount of the rolling ball 75 beyond the alternate long and short dash line (position B) that it should reach, and a distance from the position B to the tip of the black arrow is approximately 2:1.

This equalizing operation can move the rolling ball 75 to position B. FIGS. 3A, 3B, and 3C simply describe the lateral direction of the paper plane, but the same can be applied to the depth direction of the paper plane. Therefore, the actual equalizing operation often involves a large circular motion centered on a two-dimensional position as a reference position. The position of the rolling ball 75 when the camera body 1 is powered on is unknown because the position of the rolling ball 75 is not detected. However, the equalizing operation can move the rolling ball 75 to the reference position.

Figure 4A:
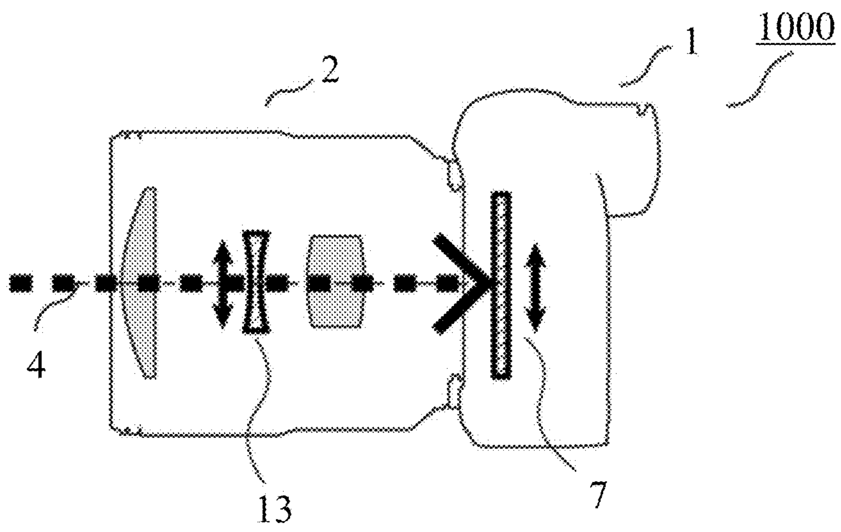
FIGS. 4A, 4B, and 4C explain a relationship between the equalizing operation of the camera image stabilizer and a canceling operation of a lens image stabilizer in the first embodiment.
Figure 4B:
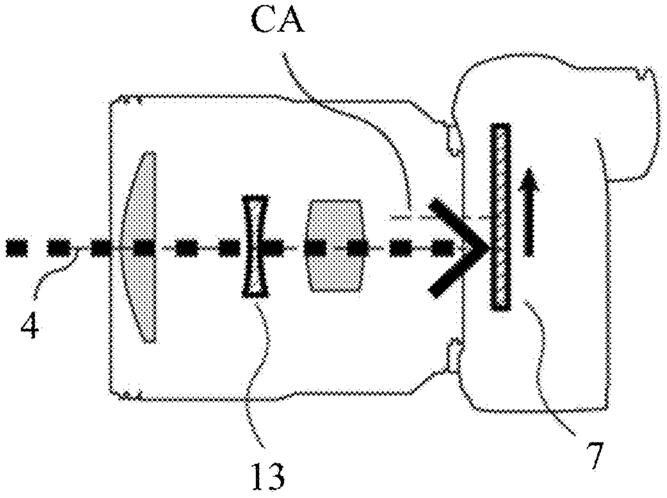
Figure 4C:
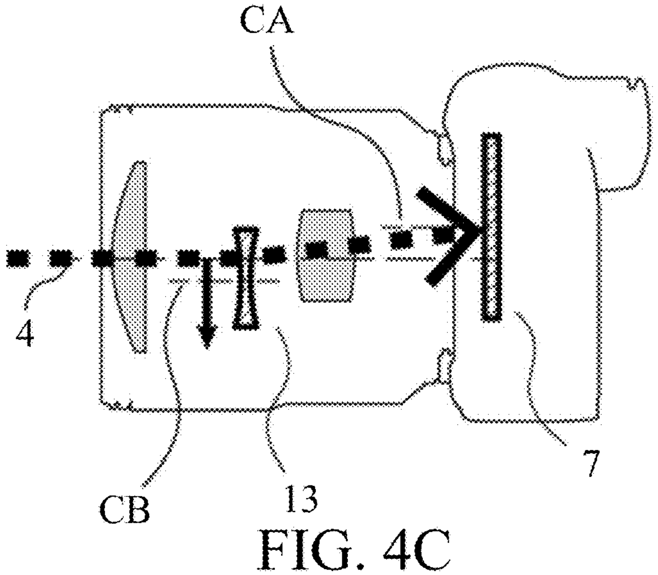
Figure 5A:
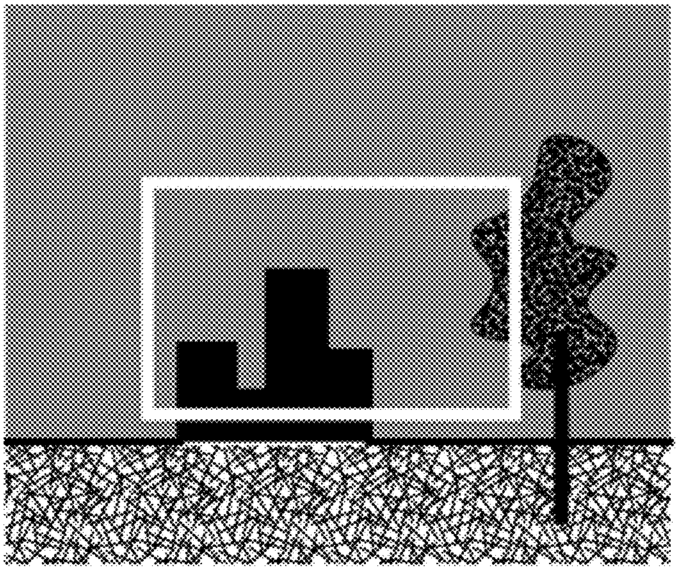
FIGS. 5A, 5B, and 5C explain output images during the equalizing operation of the camera image stabilizer and the canceling operation of the lens image stabilizer in the first embodiment.
Figure 5B:
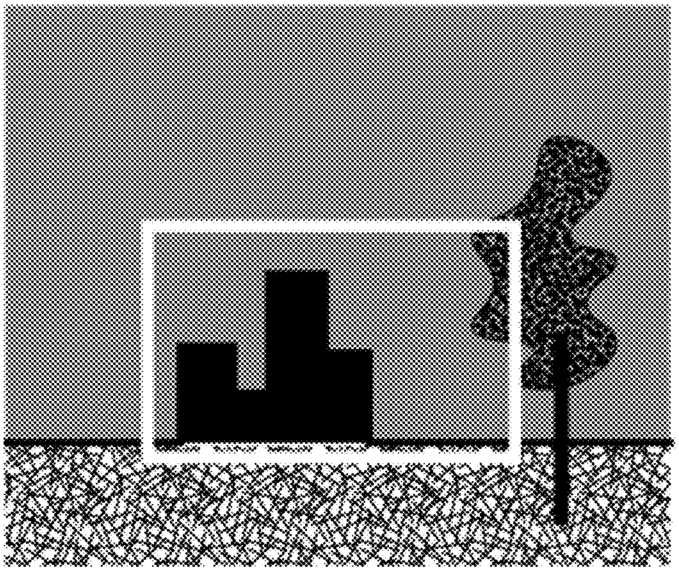
Figure 5C:
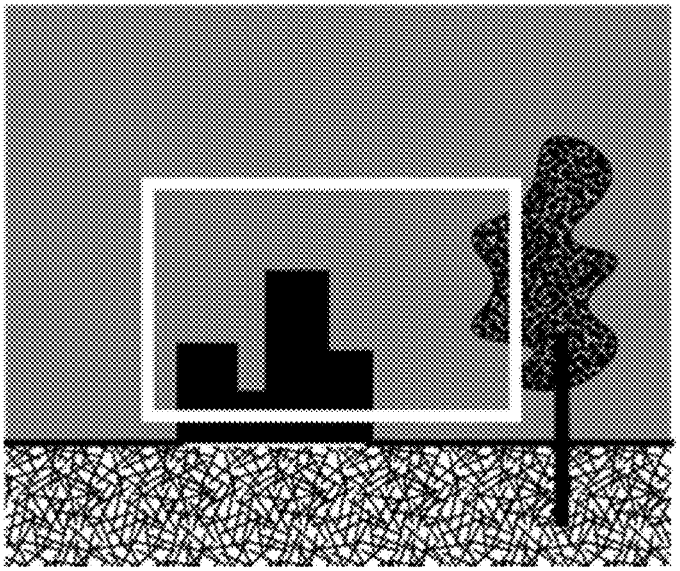

Referring now to FIGS. 4A to 5C, a description will be given of the harmful effects of the equalizing operation (initialization operation, first operation) of the image pickup apparatus 1000, and the necessity of the canceling operation (second operation). FIGS. 4A, 4B, and 4C explain a relationship between the equalizing operation performed by the camera image stabilizer and the canceling operation performed by the lens image stabilizer 13. FIGS. 5A, 5B, and 5C explain output images during the equalizing operation performed by the camera image stabilizer 7 and the canceling operation performed by the lens image stabilizer 13.

FIG. 4A illustrates a sectional view of the camera body 1 and the interchangeable lens 2 in the image pickup apparatus 1000 in a reference state. That is, the state in FIG. 4A corresponds to a state in which the equalizing operation is completed. As described above, the camera image stabilizer 7 and the lens image stabilizer 13 are movable in a direction orthogonal to the optical axis 4 (in a plane orthogonal to the optical axis 4) as illustrated by the arrows. A dotted arrow from the left side indicates a ray that passes through the imaging optical system 3 from infinity and reaches the center of the image sensor 5. At this time, in a case where the image sensor 5 is activated and an image signal is displayed on the display unit 6, assume that an area within a white frame illustrated in FIG. 5A is displayed.

FIG. 4B illustrates a state in which the camera image stabilizer 7 has moved upward in a direction orthogonal to the optical axis 4, and it is understood that the central axis CA of the image sensor 5 has moved upward. This means that the equalizing operation provides the same state as that of FIG. 3B. As illustrated in FIG. 4B, in a case where only the camera image stabilizer 7 is moved upward, the dotted arrow indicating the ray reaches a position shifted from the center of the image sensor 5 (center axis CA). At this time, the rolling ball 75 is equalized to the reference position as described with reference to FIG. 3B (equalizing operation, initializing operation). At this time, when the image sensor 5 is activated and an image signal is displayed on the display unit 6, an area clipped out of the bottom of FIG. 5A is displayed, such as the area within the white frame illustrated in FIG. 5B. In a case where the camera image stabilizer 7 moves upward, the display moves downward because the object image is vertically inverted via the imaging optical system 3. As illustrated in FIGS. 4A, 4B, 5A, and 5B, if the image sensor 5 is activated during the equalizing operation and an image signal is displayed on the display unit 6, it is assumed that an image movement caused by the equalizing operation may be visible and the image quality may be degraded.

FIG. 4C illustrates how the lens image stabilizer 13 is moved downward from the state illustrated in FIG. 4B, and an axis CB of the correction lens is offset. This is the canceling operation. Due to the canceling operation, the direction of the ray indicated by the dotted arrow is changed by the correction lens of the lens image stabilizer 13, and the ray reaches the center of the image sensor 5 (central axis CA) similarly to FIG. 4A. That is, the camera image stabilizer 7 and the lens image stabilizer 13 are simultaneously driven from the state illustrated in FIG. 4A and they are transitioned to the state illustrated in FIG. 4C. Thereby, an area similar to that illustrated in FIG. 5A is always output to the display unit 6, such as the white frame illustrated in FIG. 5C.

As described above, the lens image stabilizer 13 performs the canceling operation (second operation) to reduce the positional shift in the image signal caused by the equalizing operation (first operation) of the camera image stabilizer 7. This embodiment can output the image signal obtained by the image sensor 5 to the display unit 6 from an early stage of the equalizing operation by simultaneously performing the equalizing operation and the canceling operation. As a result, when the image pickup apparatus 1000 is powered on, the image pickup apparatus 1000 can be brought into a state where it can start imaging at an early stage.

This embodiment also rollably supports the movable part of the lens image stabilizer 13 using the rolling balls. In this embodiment, the lens image stabilizer 13 performs the canceling operation, and the canceling operation of the lens image stabilizer 13 simultaneously starts the equalizing operation of the lens image stabilizer 13 itself. That is, similarly to the camera image stabilizer 7, the lens image stabilizer 13 is configured such that the movable part (second movable part) is movable in a plane orthogonal to the optical axis 4 via the rolling balls (second rolling members). The lens image stabilizer 13 performs the canceling operation to move the second rolling member to a second position (reference position) apart from the end of the movable range of the second movable part (performs the equalizing operation).

However, strictly speaking, in order for the canceling operation that completely cancels the image shift amount caused by the equalizing operation to be the equalizing operation of the lens image stabilizer 13, it is necessary to satisfy the relationship between the moving amount of the movable part and the moving amount of the rolling ball as described with reference to FIGS. 3A, 3B, and 3C. In a case where the canceling operation of the lens image stabilizer 13 is an equalizing operation, it may be realized by jointly using the electronic image stabilizer 14 as the third correction unit to be described below, a gimbal 100 which will be described below in the second embodiment, or the like.

Figure 6A:
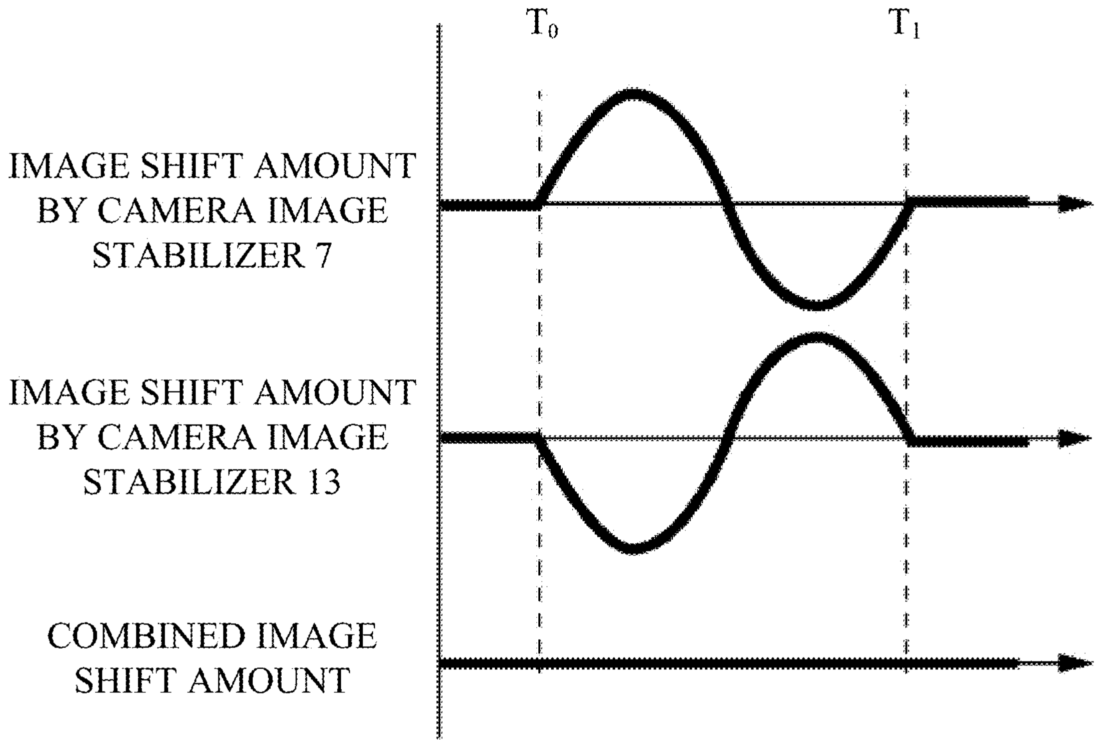
FIGS. 6A and 6B explain the equalizing operation of the camera image stabilizer and the canceling operation of the lens image stabilizer in chronological order in the first embodiment.
Figure 6B:
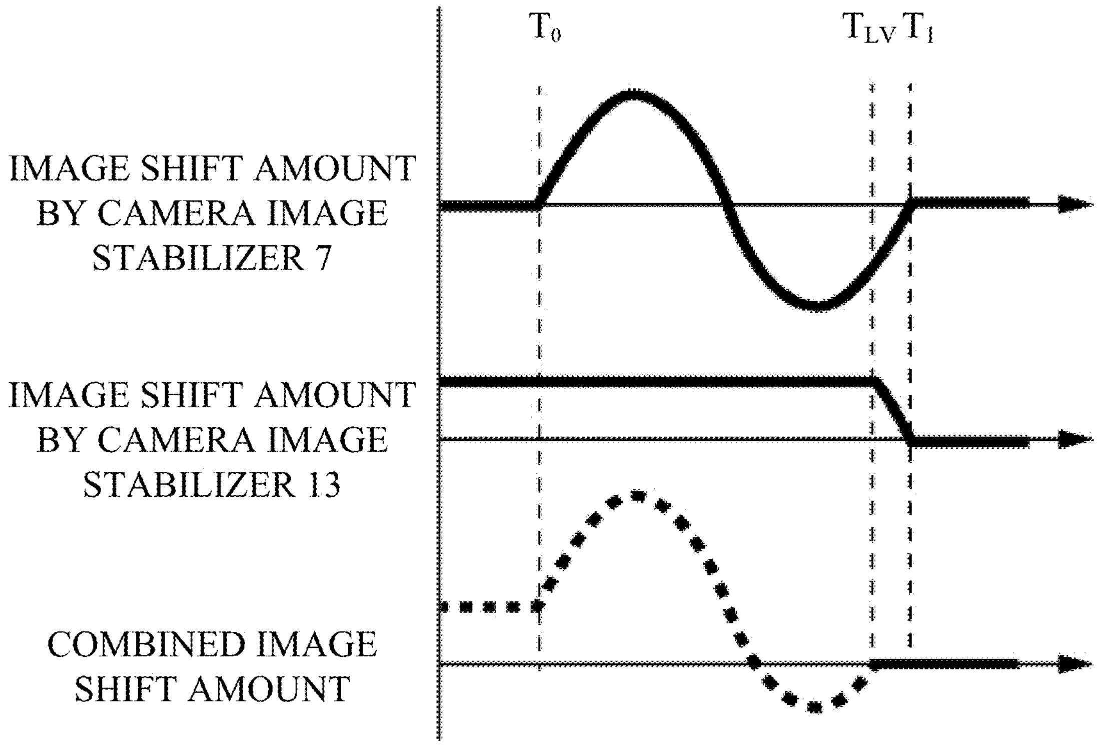

Referring now to FIGS. 6A and 6B, a description will be given of the equalizing operation of the camera image stabilizer 7 and the canceling operation of the lens image stabilizer 13 in chronological order. FIGS. 6A and 6B explain the equalizing operation of the camera image stabilizer 7 and the canceling operation of the lens image stabilizer 13 in chronological order. In FIGS. 6A and 6B, the horizontal axis represents time, and the vertical axis represents an image shift amount. As described with reference to FIGS. 4A, 4B, and 4C, performing the equalizing operation and the canceling operation can output an image to the display unit 6 at an early stage. However, an image can be output from an early stage of the equalizing operation only if the lens image stabilizer 13 satisfies a predetermined condition. That is, the lens image stabilizer 13 needs to have a correction angle enough to cancel the image moving amount that varies due to the equalizing operation of the camera image stabilizer 7.

FIG. 6A is a conceptual diagram illustrating image movement in chronological order in a case where the lens image stabilizer 13 has a correction angle that enables image movement equivalent to the equalizing operation performed by the camera image stabilizer 7. In FIG. 6A, the vertical axis indicates the image shift amount by each image stabilizer, and FIG. 6A illustrates, from the top, the image shift amount by camera image stabilizer 7, the image shift amount by lens image stabilizer 13, and the combined image shift amount of both image shift amounts. At time $T_0$, the equalizing operation by the camera image stabilizer 7 starts, performs the equalizing operation in a substantially sinusoidal waveform, and completes the equalizing operation at time $T_1$. At this time, the lens image stabilizer 13 performs a canceling operation in a substantially sinusoidal waveform whose sign is reversed so that the combined image shift amount does not change between time $T_0$ and time $T_1$. Therefore, the combined image shift amount does not change regardless of the passage of time. That is, this system can display an image signal on the display unit 6 at any timing.

FIG. 6B illustrates a case where the lens image stabilizer 13 does not have a correction angle that cancels the image shift amount caused by the equalizing operation. Similarly to the case of FIG. 6A, the equalizing operation by the camera image stabilizer 7 starts at time $T_0$ and ends at time $T_1$. On the other hand, the lens image stabilizer 13 has previously moved to a predetermined position (initial predetermined position), starts driving for a canceling operation at time $T_{LV}$, and ends the canceling operation at time $T_1$. The initial predetermined position is actually the end of the correction angle that the lens image stabilizer 13 has, and the interchangeable lens 2 cannot perform a sufficient canceling operation.

However, the lens image stabilizer 13 waits at the end of the correction angle until time $T_{LV}$. The image can be output to the display unit 6 after the time $T_{LV}$, and imaging becomes ready without waiting for the completion of the equalizing operation. The camera control unit 9 sets the time Try in accordance with the correction angle characteristic of the lens image stabilizer 13 and controls image display on the display unit 6.

Figure 7A:
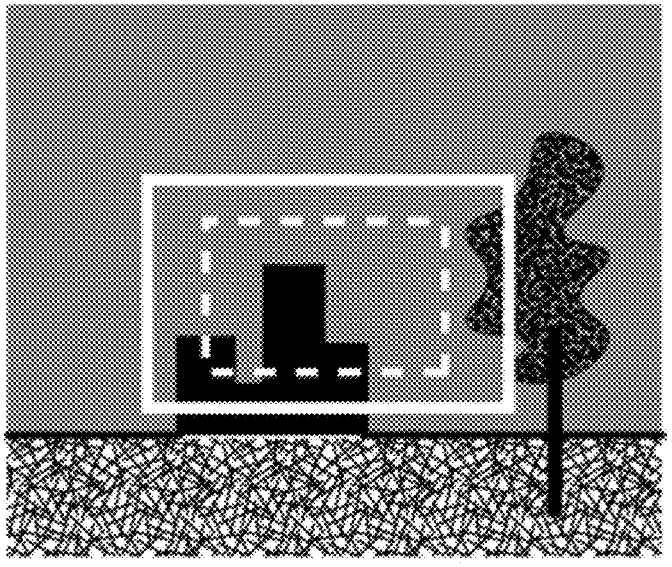
FIGS. 7A, 7B, and 7C explain the canceling operation of an electronic image stabilizer according to the first embodiment.
Figure 7B:
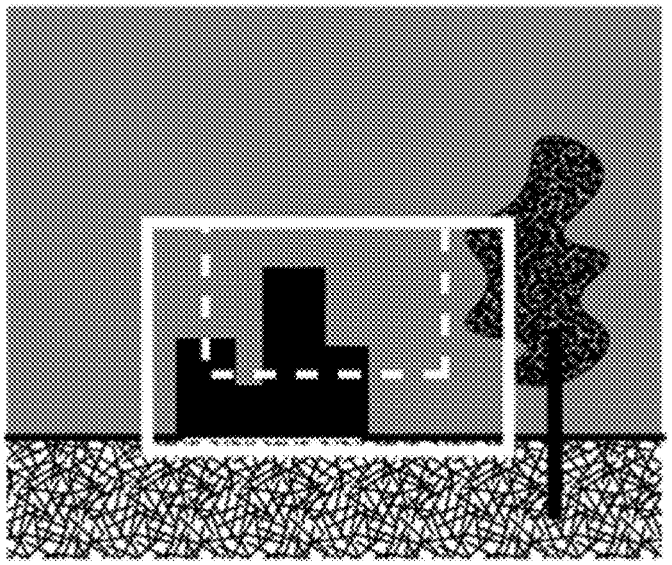
Figure 7C:
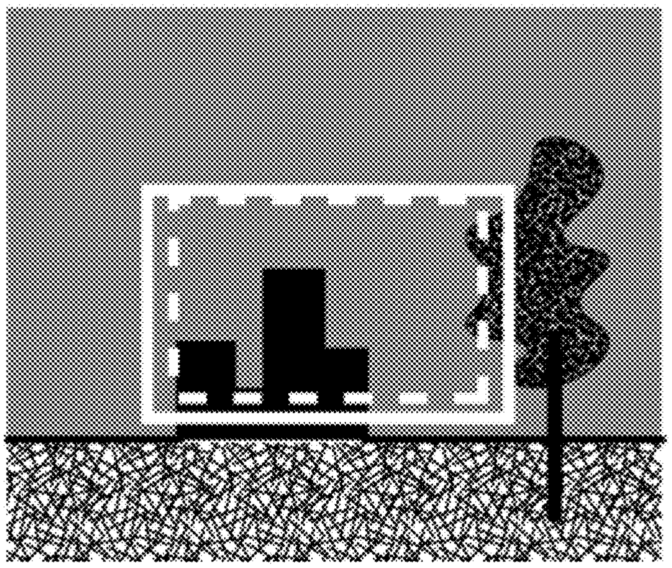

Referring now to FIGS. 7A, 7B, and 7C, a description will be given of the canceling operation performed by the electronic image stabilizer 14. FIGS. 7A, 7B, and 7C explain the canceling operation of the electronic image stabilizer 14. As described above, the electronic image stabilizer 14 performs image stabilization by clipping out a part (partial region) of the image signal acquired by the image sensor 5. The electronic image stabilizer 14 performs an image stabilizing operation as an electronic canceling operation instead of the optical canceling operation performed by the lens image stabilizer 13. That is, the electronic image stabilizer 14 can function as a third correction unit configured to electronically clip out a partial region in the image signal for image stabilization.

Similarly to FIG. 5A, FIG. 7A illustrates an object area acquired by the image sensor 5 in the reference state by a solid white frame, and an area clipped by the electronic image stabilizer 14 by a dotted white frame. In a case where the camera image stabilizer 7 starts the equalizing operation and reaches the state illustrated in FIG. 4B, the object area acquired by the image sensor 5 moves downward, as illustrated by the solid white frame in FIG. 7B. At this time, as illustrated by the dotted white frame, the electronic image stabilizer 14 changes the clipped area, and thereby an area can be clipped as in FIG. 7A. That is, during the equalizing operation, the clipped area of the electronic image stabilizer 14 is transitioned from FIG. 7A to the dotted white frame in FIG. 7B, and output to the display unit 6. Thereby, even if the image signal is displayed on the display unit 6 at an early stage of the equalizing operation, the visualization of the equalizing operation can be suppressed. Thus, for example, after the image pickup apparatus 1000 is powered on, the display unit 6 can be immediately displayed and imaging can become ready.

Since the displayable area is only the clipped area that can cancel the influence of the equalizing operation, it is necessary to wait for the solid white frame that is the original imaging area to be displayed. However, a photometry operation for capturing the first image can be performed, for example, the time necessary to start imaging can be substantially reduced. In displaying an image on the display unit 6, the image within the dotted white frame may be enlarged to cover the entire display area of the display unit 6, or may be displayed at the same size.

FIG. 7C illustrates a state just before the equalizing operation is completed, and the solid white frame illustrates a state that is almost returning to the state illustrated in FIG. 7A. When the state completely returns to FIG. 7A, a clip ratio is gradually changed from the state of FIG. 7B so that the solid white frame and the dotted white frame have the same area (that is, the clip ratio is 100%). Sequentially displaying the clipped area in this way, the entire imaging area is gradually displayed on the display unit 6 after the image pickup apparatus 1000 is started up, and the initial photometry operation can utilize a pixel signal of a wider area.

In this embodiment, the canceling operation by the second correction unit (lens image stabilizer 13) or the third correction unit (electronic image stabilizer 14) is an independent operation, but this embodiment is not limited to this example. That is, in a case where the image shift amount caused by the canceling operation of the second correction unit (lens image stabilizer 13) is insufficient, the third correction unit (electronic image stabilizer 14) may provide an auxiliary operation. At this time, the camera control unit 9 controls the third correction unit so as to reduce the positional shift in the image signal caused by the insufficient canceling operation of the second correction unit. The image pickup apparatus 1000 according to this embodiment includes a first correction unit, a second correction unit, and a third correction unit, but is not limited to this example. This embodiment is also applicable to an image pickup apparatus having a first correction unit that performs an equalizing operation, and at least one of a second correction unit or a third correction unit that performs a canceling operation.

The image pickup apparatus 1000 according to this embodiment can reduce the startup time while properly performing the equalizing operation of the rolling ball of the image stabilizer.

Second Embodiment

Figure 8A:
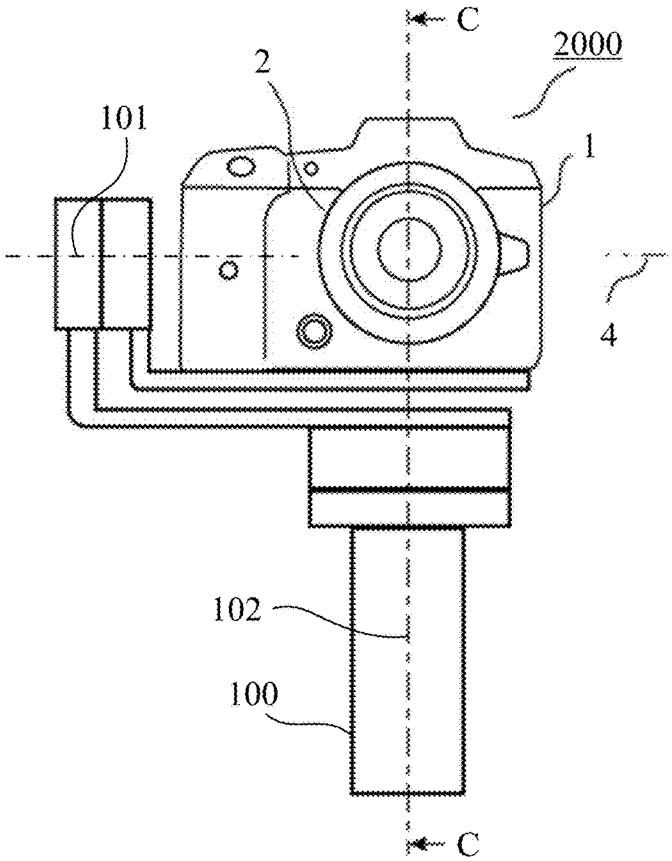
FIGS. 8A and 8B are configuration diagrams of an image pickup apparatus according to a second embodiment.
Figure 8B:
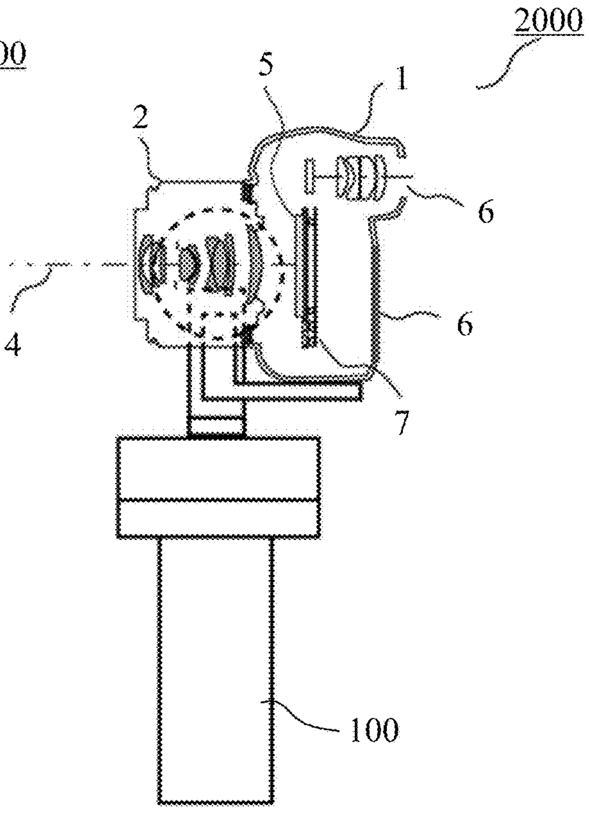

Referring now to FIGS. 8A and 8B, a description will be given of an image pickup apparatus 2000 according to a second embodiment. FIGS. 8A and 8B explain the image pickup apparatus 2000. FIG. 8A is a front view of the image pickup apparatus 2000, and FIG. 8B is a sectional view taken along an alternate long and short dash line C-C in FIG. 8A.

The image pickup apparatus 2000 includes a camera body 1 as a digital single-lens camera (camera unit), an interchangeable lens 2 attachable to and detachable from the camera body 1, and a gimbal (gimbal type image stabilizer, second correction unit) 100 to which the camera body is detachably attached. In this embodiment, the configurations of the camera body 1 and the interchangeable lens 2 are the same as those of the image pickup apparatus 1000 according to the first embodiment. The gimbal 100 can rotate and swing around two axes 101 and 102, pitch and yaw axes, according to vibrations applied to the image pickup apparatus 2000. That is, the gimbal 100 swings the camera unit including the imaging optical system 3 and the image sensor 5. The user can capture an image by holding a holder portion of the gimbal 100 as a fixed part. The camera body 1 in the image pickup apparatus 2000 has a camera image stabilizer 7 that performs an equalizing operation, similarly to the image pickup apparatus 1000.

Figure 9:
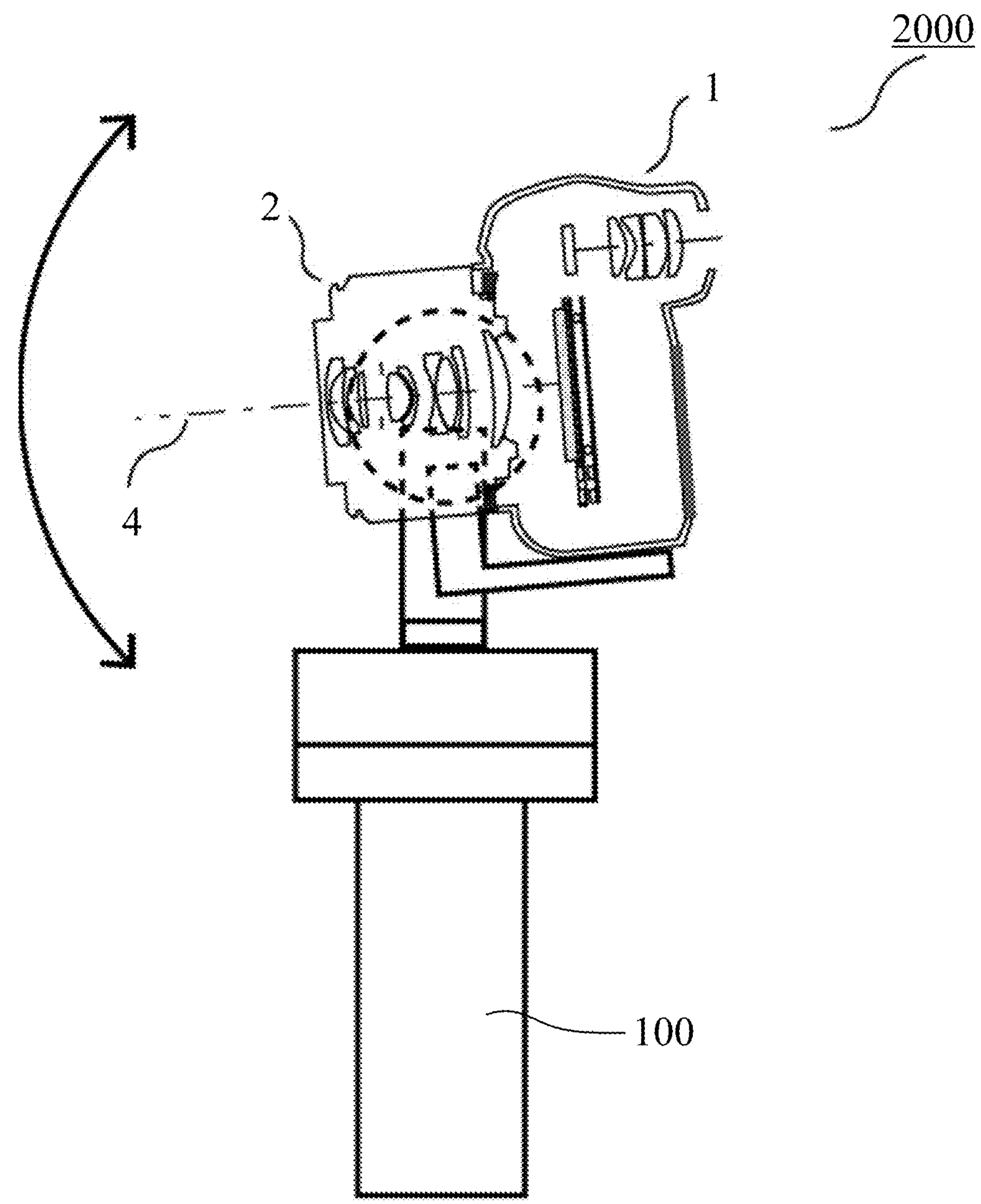
FIG. 9 explains an equalizing operation and a canceling operation in the image pickup apparatus according to the second embodiment.

FIG. 9 explains image stabilization performed by the gimbal 100. In FIG. 9, the image pickup apparatus 2000 is tilted in the pitch direction due to the movement of the gimbal 100 that rotates and swings about the axis 101. The rotation and swing operation can provide an image output similar to the image shift performed by the lens image stabilizer 13 in the first embodiment. In other words, the image pickup apparatus 2000 using the gimbal 100 can perform a canceling operation using the gimbal 100, similarly to the first embodiment. The image output during the canceling operation and the like are similar to that of the first embodiment, and a description thereof will be omitted.

Figure 10A:
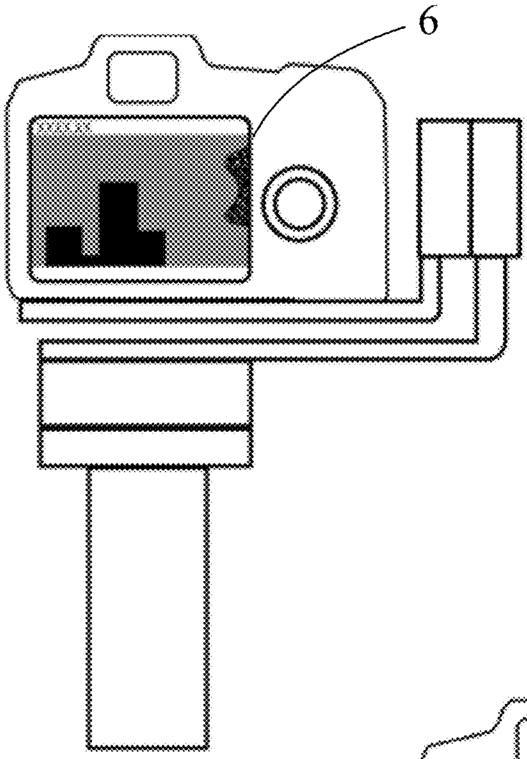
FIGS. 10A and 10B explain a display unit in the image pickup apparatus according to the second embodiment.
Figure 10B:
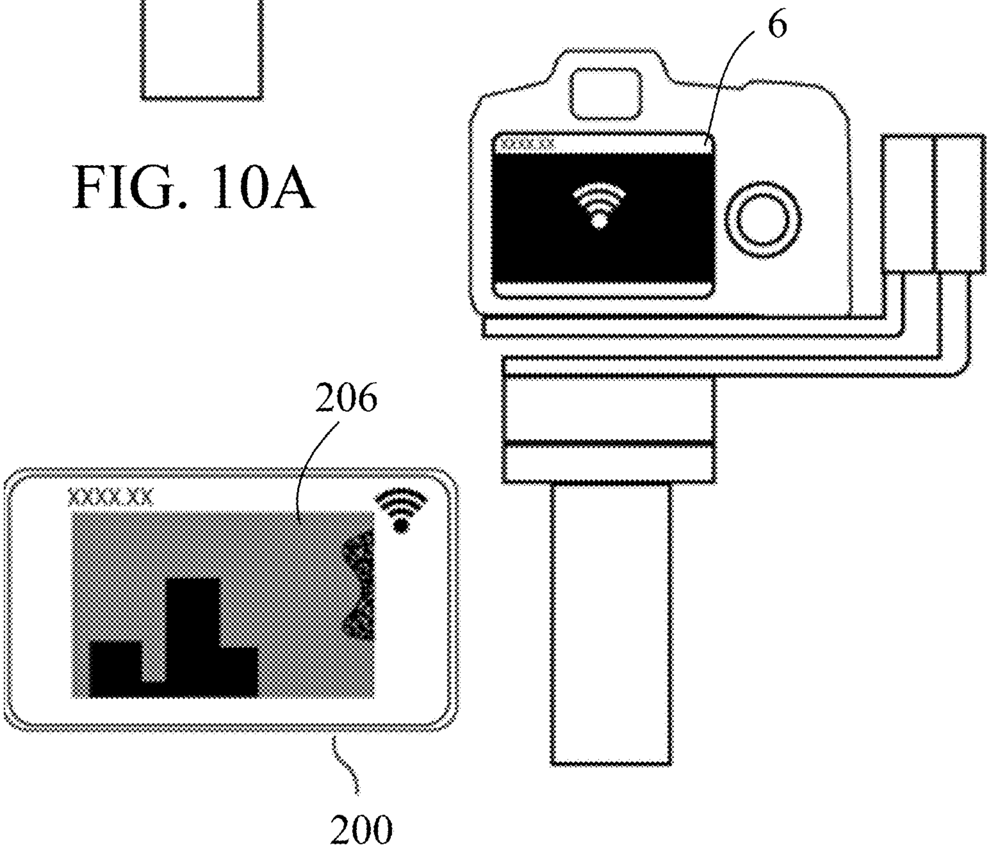

FIGS. 10A and 10B are rear views of the image pickup apparatus 2000. FIG. 10A illustrates a state in which a captured image is displayed on the display unit 6 (in a case where the display unit is integrated with the camera unit). FIG. 10B illustrates a state in which a captured image is displayed on the display screen (display unit) 206 of a smartphone 200 using Wi-Fi communication (the display unit is separated from the camera unit). In the state illustrated in FIG. 10A, when the gimbal 100 functions, the digital single-lens reflex camera (camera body 1) moves integrally, so the display unit 6 also moves. In this configuration, even if the display content on the display unit 6 remains stationary after the cancel operation is performed, it is difficult for the user to feel the effect and thus the image pickup apparatus 2000 does not perform the canceling operation. On the other hand, in the state of FIG. 10B, the user can view the display screen 206 of the smartphone 200 in a substantially stationary state, and thus the image pickup apparatus 2000 performs the canceling operation.

In this embodiment, the camera unit mounted on the gimbal 100 is a digital single-lens reflex camera, but this embodiment is not limited to this example. This embodiment is applicable to any image pickup apparatus, such as a compact digital camera, as long as it includes an image stabilizer that requires an equalizing operation, an image sensor, and an imaging optical system.

In each embodiment, each image stabilizer performs only an equalizing operation or a canceling operation, but each embodiment is not limited to this example. For example, in a case where the power is turned on while the user holds the image pickup apparatus, an operation may be simultaneously performed that reduces image blur caused by camera shake, using at least one of the camera image stabilizer 7, the lens image stabilizer 13, the electronic image stabilizer 14, and the gimbal 100.

In each embodiment, the first correction unit includes the camera image stabilizer 7, the second correction unit includes the lens image stabilizer 13 or the gimbal 100, and the third correction unit includes the electronic image stabilizer 14, but each embodiment is not limited to this example. The first correction unit, the second correction unit, and the third correction unit may be interchangeable, such as the first correction unit as the lens image stabilizer 13 and the second correction unit as the camera image stabilizer 7, or an arbitrary correction unit may be selected from a plurality of correction units including another correction unit.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each embodiment can provide an image pickup apparatus that can reduce startup time while properly performing an initialization operation of an image stabilizer.

This application claims priority to Japanese Patent Application No. 2023-047635, which was filed on Mar. 24, 2023, and which is hereby incorporated by reference herein in its entirety.

What is claimed is:

1. An image pickup apparatus comprising:

an image sensor configured to photoelectrically convert an optical image formed by an imaging optical system and to output an image signal; and a processor configured to control a first correction unit and a second correction unit for image stabilization, wherein the first correction unit includes a first movable part, and a first rolling member, via which the first movable part is movable in a plane orthogonal to an optical axis of the imaging optical system, wherein the processor is configured to control the first correction unit to perform a first operation of the first movable part that moves the first rolling member to a first position apart from an end of a movable range of the first rolling member, and to control the second correction unit to perform a second operation that reduces a positional shift in the image signal caused by the first operation, wherein the first correction unit moves the image sensor disposed at the first movable part or a correction lens included in the imaging optical system, and the second correction unit swings a camera unit including the imaging optical system and the image sensor, and wherein the processor does not perform the second operation in a case where a display unit is integrated with the camera unit.

2. The image pickup apparatus according to claim 1, further comprising a display unit configured to display the image signal, wherein the processor is configured to cause the display unit to display the image signal in which the positional shift has been reduced while the second correction unit is performing the second operation.

3. The image pickup apparatus according to claim 1, wherein the second correction unit performs the second operation while the first correction unit is performing the first operation.

4. The image pickup apparatus according to claim 1, wherein the first position is a center of the movable range of the first movable part.

5. The image pickup apparatus according to claim 1, wherein the processor is configured to perform the first correction unit and the second correction unit so as to perform the first operation and the second operation as an initialization operation when the image pickup apparatus is powered on.

6. The image pickup apparatus according to claim 1, wherein the first correction unit moves the image sensor disposed at the first movable part, and wherein the second correction unit moves a correction lens included in the imaging optical system.

7. The image pickup apparatus according to claim 6, wherein the second correction unit includes a second movable part, and a second rolling member, via which the second movable part is movable in the plane orthogonal to the optical axis, and wherein the second operation moves the second rolling member to a second position apart from an end of a movable range of the second rolling member.

8. The image pickup apparatus according to claim 1, further comprising a third correction unit configured to electronically clip a partial region in the image signal for the image stabilization, wherein the processor is configured to control the third correction unit to reduce the positional shift in the image signal caused by insufficiency of the second operation of the second correction unit.

9. The image pickup apparatus according to claim 1, wherein the first correction unit moves the image sensor disposed at the first movable part or a correction lens included in the imaging optical system, and wherein the second correction unit electronically clips out a partial region in the image signal for the image stabilization.

10. The image pickup apparatus according to claim 1, wherein the processor is configured to perform the second operation in a case where a display unit is separate from the camera unit.

11. The image pickup apparatus according to claim 1, wherein the processor is configured to control at least one of the first correction unit and the second correction unit so as to correct image blur caused by shake applied to the image pickup apparatus during the first operation and the second operation.

12. A control method of an image pickup apparatus, the control method comprising:

a first step of photoelectrically converting an optical image formed by an imaging optical system and of outputting an image signal; and a second step of controlling a first correction unit and a second correction unit for image stabilization, wherein the first correction unit includes a first movable part, and a first rolling member, via which the first movable part is movable in a plane orthogonal to an optical axis of the imaging optical system, wherein the second step controls the first correction unit to perform a first operation of the first movable part that moves the first rolling member to a first position apart from an end of a movable range of the first rolling member, and controls the second correction unit to perform a second operation that reduces a positional shift in the image signal caused by the first operation, wherein the first correction unit moves an image sensor disposed at the first movable part or a correction lens included in the imaging optical system, and the second correction unit swings a camera unit including the imaging optical system and the image sensor, and wherein the second operation is not performed in a case where a display unit is integrated with the camera unit.

13. A non-transitory computer-readable storage medium storing a program for causing a computer to execute the control method according to claim 12.

* * * * *